United States Patent Office 3,186,810
Patented June 1, 1965

3,186,810
STABILIZED DISTILLATE FUEL OILS AND ADDITIVE COMPOSITIONS THEREFOR
William P. Dunworth, Wilmington, Del., assignor to E. I. du Pont de Nemours and Company, Wilmington, Del., a corporation of Delaware
No Drawing. Filed Mar. 9, 1962, Ser. No. 178,536
4 Claims. (Cl. 44—62)

This invention relates to stabilized petroleum distillate fuel oils and to additive compositions for stabilizing such fuel oils. More particularly, the invention is concerned with fuel oils, such as diesel engine fuels and burner oils, that are normally susceptible to deterioration with the formation of insoluble sludge and sediment, especially at elevated temperatures, which fuel oils have been stabilized to inhibit such deterioration; and to homogeneous liquid concentrates of a combination of additive compounds for so stabilizing such fuel oils, which concentrates are readily soluble in the fuel oils and which are unusually effective to so stabilize such fuel oils.

Catlin and Robbins, in U.S. Patent 2,737,452, describe stabilized fuel oil compositions obtained by incorporating into the oils certain oil-soluble, basic amino nitrogen-containing addition type copolymers. Such additives function primarily to suspend sludge and sediment that may already be present or that may form in their presence. While also somewhat effective as stabilizers, they are not entirely satisfactory for inhibiting the formation of colored bodies and insoluble matter, particularly at elevated temperatures. Diesel fuels, having improved high temperature stability, are expressly desired, for example, for use in locomotives wherein rather stringent pre-combustion conditions generally prevail, and special methods have been devised to test the suitability of fuels for this use. In jet fuels also, which serve as heat exchange media for the engine before being combusted, high thermal stability is of prime importance.

Quite naturally, co-additives have been sought to augment the already satisfactory dispersancy obtainable with the polymeric additives and thereby to render fuel compositions less suceptible to the formation of normally occurring sludges and sediments that tend to clog fuel feed lines, spray nozzles and filter screens. Substances proposed heretofore for use in conjunction with the polymeric dispersants, including certain long straight-chain and branched-chain surface active amines, though providing some protection at ordinary atmospheric temperatures, are not entirely satisfactory stabilizers at elevated temperatures.

Another problem, often encountered with fuel oils in the field, is the development of objectionable haze under conditions of storage and transfer, apparently the result of water accumulating in the fuel, as described by Eberz in U.S. Patent 2,550,982.

It is an object of this invention to improve the stability of hydrocarbon distillate fuel oils against deterioration such as the formation of discoloration, insoluble sludge, and sediment. A further object is to augment the stabilizinz properties of basic amino nitrogen-containing polymeric dispersants of fuel oil sludge and sediment by employing in combination therewith an inhibitor of fuel oil deterioration processes which is particularly effective at elevated temperatures as well as at ordinary temperatures and in which the combination of additives function synergistically and are more effective than other similar combinations of the prior art. Another object is to provide additive compositions for distillate hydrocarbon fuel oils, which compositions are homogeneous concentrates of a plurality of co-additives, and which concentrates are easily incorporated into said fuel oils and are unusually effective to inhibit discoloration and the formation and deposition of insoluble sludge and sediment in such fuel oils, particularly at high temperatures. Other objects are to provide new compositions of matter and to advance the art. Still other objects will appear hereinafter.

The above and other objects may be accomplished in accordance with this invention which comprises a distillate hydrocarbon fuel oil containing (a) From 0.00017% to about 0.01% by weight of an oil-soluble, basic amino nitrogen-containing addition type copolymer containing in combined form as its essential monomeric components copolymerizable ethylenically unsaturated compounds, each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., and (b) From 0.00017% to about 0.01% by weight of an N-substituted cyclohexylamine in which the substituents consist of 1 to 2 alkyl groups of 1 to 4 carbon atoms;

and an additive composition for distillate hydrocarbon fuel oils, which additive composition consists essentially of (a) an oil-soluble, basic amino nitrogen-containing addition type copolymer containing in combined form as its essential monomeric components copolymerizable ethylenically unsaturated compounds, each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C., (b) from 0.2 to about 3 parts by weight per part of said copolymer (a) of an N-substituted cyclohexylamine in which the substituents consist of 1 to 2 alkyl groups of 1 to 4 carbon atoms, and (c) a normally liquid inert hydrocarbon carrier solvent in an amount to constitute from about 20% to about 80% by weight of the composition.

It has been found that the combination of the basic amino nitrogen-containing addition type copolymer and the N-loweralkyl substituted cyclohexylamine is unusually effective to stabilize fuel oils against deterioration, particularly at elevated temperatures. The basic amino nitrogen-containing copolymer apparently functions to disperse sludge and sediment, while the nonpolymeric N-substituted cyclohexylamine serves effectively to retard the formation of such insoluble matter. Surprisingly, the combination of additives is more effective to stabilize the fuel than either additive alone on an equal weight basis, that is, the additives function synergistically in the combination to produce results greater than the sum of the individual components. Moreover, the N-substituted cyclohexylamines, in combination with the copolymers of this invention, are more effective high temperature inhibitors of sludge formation than other amines heretofore suggested for inhibiting sludge formation in such fuel oils, such as the tertiary alkyl primary amines disclosed by Andress in U.S. Patent 2,945,749. Furthermore, it has been found that the oil-soluble basic amino nitrogen-containing copolymer and the N-substituted cyclohexylamine may both be dissolved in high concentrations in conventional normally liquid hydrocarbon carrier solvents to form homogeneous concentrates which can be readily added to and dissolved in the distillate hydrocarbon fuel oils.

Surprisingly, long-chain quaternary ammonium halides, which are effective and desirable to retard the formation of haze and to eliminate fogging in distillate hydrocarbon fuel oils, may be included in such concentrates and the resulting concentrates will be homogeneous. Also, many other conventional additives may be included in such concentrates without destroying their homogeneity. Concentrates and fuel oils, containing such quaternary ammonium halides in combination with such copolymers and such N-substituted cyclohexylamines, constitute additional important novel compositions of this invention.

The N-substituted cyclohexylamine component may be an N-monoloweralkyl- or an N,N-diloweralkylcyclohexylamine in which "loweralkyl" means an alkyl radical of 1–4 carbon atoms, such as N-methylcyclohexylamine, N,N-dimethylcyclohexylamine, N-ethylcyclohexylamine, N,N-diethylcyclohexylamine, N-propylcyclohexylamine, N,N-dipropylcyclohexylamine, N-butylcyclohexylamine, N,N-dibutylcyclohexylamine, and mixtures of any 2 or more thereof. The tertiary amines are preferred, particularly N,N-diethylcyclohexylamine. These mono- and di-loweralkylcyclohexylamines are conveniently obtained from the correspondingly N-alkylated anilines, by ring-reduction as known to the art. For example, aniline is methylated by reaction with methyl alcohol in the presence of an acid catalyst. The resulting mixture may be catalytically hydrogenated directly to a mixture of corresponding mono- and di-N-methylated cyclohexylamines for use in this invention, or the mixture may first be separated into its constituents before the reduction step.

The polymeric sludge dispersant may be any of those described by Catlin et al. in U.S. Patent 2,737,452, Biswell in U.S. Patent 2,805,925, and Winnick in U.S. Patent 2,888,340. Such polymeric substance may be defined as an oil-soluble, basic amino nitrogen-containing addition type copolymer containing in combined form as its essential monomeric components copolymerizable ethylenically unsaturated compounds, each containing only one polymerizable ethylenic linkage, at least one of which components is amine-free and contains from 8 to about 18 carbon atoms in an aliphatic hydrocarbon chain which in the polymer is not part of the main chain, and one of the components as it exists in the polymer containing a basic amino nitrogen in the side chain, said copolymer containing 0.1% to 3.5% by weight of basic amino nitrogen and said copolymer having an inherent viscosity of 0.1 to 3.0 as determined at 0.1% weight/volume concentration in benzene at 25° C. As a class, these copolymers are characterized as having basic amino groups appended to the main polymer chain. Preferred polymers contain pendent tertiary amino groups such as diethylaminoethyl-, dimethylaminopropyl-, dibutylaminoethyl-, and 2-pyridylethyl groups, as illustrated in the following representative polymers: the 50/40/10 tripolymer of octadecenyl methacrylate, styrene, and beta-diethylaminoethyl methacrylate; the 50/40/10 tripolymer of technical-lauryl methacrylate, styrene and N-(3-dimethylaminopropyl) methacrylamide; the 80/20 copolymer of lauryl methacrylate and beta-diethylaminoethyl methacrylate; the 90/10 copolymer of octadecenyl methacrylate and diethylaminoethyl methacrylate; the 77/23 copolymer of lauryl methacrylate and dibutylaminoethyl methacrylate; the 90/10 copolymer of cetyl methacrylate and 4-vinylpyridine; the 80/20 copolymer of lauryl methacrylate and 4-vinylpyridine; the 92.5/7.5 copolymer of lauryl methacrylate and diethylaminoethyl methacrylate; the 80/20 copolymer of vinyl lauryl ether and vinyl diethylaminoethyl ether; and the 92.5/7.5 copolymer of vinyl laurate and diethylaminoethyl methacrylate; the quantities expressing the above compositions being parts by weight.

Broadly, the distillate fuel oils are mixtures of hydrocarbons boiling in the range of from about 300° F. to about 900° F., which mixtures are normally susceptible to deterioration with the formation of colored bodies and insoluble sludge and sediment under thermal and oxidative conditions. The present invention is particularly concerned with stabilizing such products as diesel engine oils for stationary, marine, automotive and locomotive type engines, said fuels being particularly described by ASTM Specification D–975–53T; and domestic and industrial heating oils, as described in ASTM Specification D–396–48T. Included are straight-run fuels, thermally cracked, catalytically cracked, thermally reformed, and catalytically reformed stocks, and blends of 2 or more thereof, as known and commonly employed in the art.

The quantities of the co-additives employed in practicing this invention will vary depending on the particular additives, the initial condition and degree of instability of the fuel oil, and the effect desired. Normally, however, there is used at least about 0.5 lb. of basic amino nitrogen-containing copolymer for each 1000 bbls. of fuel (0.00017% by weight based on the fuel) and not more than about 30 lbs./1000 bbls. (0.01% by weight), preferably from about 1.5 to about 15 lbs./1000 bbls. (0.005% to 0.005% by weight). The N-substituted cyclohexyl amine is used in comparable quantities, generally in amounts corresponding to from about 0.2 to about 3 parts by weight per part of the copolymer, and preferably from about 0.5 to about 2 parts per part of copolymer.

The co-additives of this invention are oil-soluble and may be added directly as such to the fuel to be stabilized, or they may be added as mixtures, with or without solvents, which may include, if desired, other addition agents normally associated with the finished fuels. Blended concentrates, containing a total of from about 20% to about 80%, preferably from about 40% to about 60%, by weight of the co-additives in normally liquid inert hydrocarbon carrier solvents represent the commercial form of the fuel oil stabilizing compositions. In other words, the carrier solvent will be in an amount to constitute from about 20% to about 80%, preferably from about 40% to about 60%, by weight of the blended concentrates or additive compositions. Suitable carrier solvents are exemplified by such hydrocarbon solvents as kerosene, benzene, toluene, the xylenes, and the like, and mixtures of any two or more of such solvents. As illustrated by Catlin et al., in U.S. Patent 2,737,452, the basic amino nitrogen-containing copolymers are normally prepared in the presence of an inert hydrocarbon solvent, and they may be used in this invention as so prepared without separation from the solvent, whereby such solvent will constitute part or all of the carrier solvent in the blended concentrates. Other addition agents, that may be employed in conjunction therewith in the fuels, include metal deactivators, corrosion inhibitors, antistatic agents, antihazing agents, and the like.

In particularly desirable embodiments of this invention, co-additive concentrates are provided comprising essentially homogeneous blends of the basic amino nitrogen-containing copolymer and the N-substituted cyclohexylamine co-additives together with a long-chain quaternary ammonium surfactant as haze retarder. As described by Eberz in U.S. Patent 2,550,982, surface active quaternary ammonium compounds are particularly effective to inhibit or eliminate fogging in hydrocarbon products. When it was attempted to formulate a multipurpose additive comprising a basic amino nitrogen-containing copolymeric dispersant as herein defined and a haze retarder, such as a quaternary ammonium surfactant (in the absence of an N- substituted cyclohexylamine of this invention), an unexpected difficulty developed. The additives, while soluble individually in the usual hydrocarbon solvents, are mutually insoluble in combination at the concentrations ordinarily employed for formulating fuel oil additive concentrates. However, in the presence of an N-substituted cyclohexylamine of this invention, both the copolymeric dispersant and the antihazing quaternary ammonium salt can be used together to readily form homogeneous concentrated blends with the usual hydrocarbon solvents. For this use, the quaternary ammonium compound usually amounts to from about 0.3 to about 0.5 part by weight per part of the copolymeric dispersant, and from about 0.3 to about 3 lbs./1000 bbls. (0.0001% to 0.001% weight) of the fuel.

Typical antihazing quaternary ammonium surfactants are the oil-soluble quaternary ammonium halides in which the groups attached to nitrogen, other than the halogen atom, consist of 1 to 2 hydrocarbon radicals of 8 to 20 carbons each and 3 to 2 lower alkyl radicals. Suitable quaternary ammonium halides are disclosed by Eberz in U.S. Patent 2,550,982 and by Siegel in U.S. Patent 3,008,813. Preferably, the long-chain hydrocarbon radicals are $C_{12}$ to $C_{18}$ alkyl radicals and the other hydrocarbon radicals are loweralkyl, particularly methyl, radicals. The halogen atom of the quaternary ammonium halide is generally bromine or chlorine, preferably chlorine. Suitable quaternary ammonium halides include dioctadecyl dimethyl ammonium chloride, octadecyl trimethyl ammonium chloride, dodecyl trimethyl ammonium chloride, the $C_{12}$–$C_{14}$ alkyl trimethyl ammonium chlorides, the di-$C_{12}$–$C_{14}$ alkyl dimethyl ammonium chlorides, hexadecyl trimethyl ammonium bromide, hexadecyl trimethyl ammonium chloride, dioctadecyl dimethyl ammonium bromide, and dicoco dimethyl ammonium chloride wherein "coco" stands for the mixed $C_8$–$C_{18}$ alkyl radicals of cocoamine.

In formulating the multipurpose concentrates, it is often beneficial, though not necessary, to employ small proportions of a blending and fluidizing solvent such as isopropyl alcohol.

In order to more clearly illustrate this invention, preferred modes of carrying the same into effect, and the advantageous results to be obtained thereby, the following examples are given, in which the parts and proportions are by weight except where specifically indicated otherwise.

EXAMPLE 1

N,N-dimethylcyclohexylamine, Polymer A, kerosene, and other components as identified below were mixed in the proportions given in Table I to provide fuel oil stabilizing additive compositions I–V of this invention.

Polymer A is a 50% by weight solution in kerosene of a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C., which was prepared essentially as described by Catlin and Robbins in U.S. Patent 2,737,452. Thus, the amount of the tripolymer (active ingredient) will be half of the indicated amounts of Polymer A.

The dicocodimethyl ammonium chloride, where used, was added as a 75% by weight solution in isopropyl alcohol.

Table 1

N,N-DIMETHYLCYCLOHEXYLAMINE/AMINO NITROGEN CONTAINING POLYMER BLENDS

[Blend composition, percent weight]

| Additives | I | II | III | IV | V |
|---|---|---|---|---|---|
| Polymer A | 40 | 30 | 60 | 40 | 40 |
| N,N-dimethylcyclohexylamine | 30 | 35 | 20 | 20 | 30 |
| Dicocodimethyl ammonium chloride | | | 10 | 10 | 10 |
| Kerosene* | 30 | 35 | 10 | 30 | 20 |

*In addition to that in Polymer A.

Fuel oil stabilizing compositions I, II, III, IV and V above are used by stirring into representative commercial No. 2 fuel oils, Fuel A (catalytically cracked) and Fuel B, in the concentrations given in Table II, which also summarizes typical test results. The effectiveness of these compositions to inhibit deterioration and insoluble residue formation at elevated temperatures is illustrated by the Enjay Test and the EMD Diesel Fuel Stability Test.

The Enjay Test involves a 16-hour exposure of the sample at 210° F. and is more fully described by Geller and Sturgis in U.S. Patent 2,912,314 (Example 1) and by Ertelt et al. in U.S. Patent 2,974,025 (Example 2).

The EMD Diesel Fuel Test (also known as the "Union Pacific Test" or the "Nalco" Test) is made as follows: a 50 ml. sample of the test fuel is heated at 300° F. for 90 minutes (in an oil bath or an oven), is then cooled to room temperature, and filtered through No. I Whatman filter paper (5.5 cm. size). The filter paper is washed with heptane and dried. The nature of the precipitate or discoloration remaining on the filter paper indicates the extent of fuel deterioration. A grey to black discoloration is sufficient basis for rejecting the fuel.

Table II

STABILIZATION OF FUEL OIL WITH DIMETHYLCYCLOHEXYLAMINE-AMINOPOLYMER BLENDS

| Additive Blend | Concentration, lbs./1,000 bbls. (percent wt.) of fuel | Enjay Test (210° F.) | | | | EMD Diesel Fuel Test (300° F.)—Filter paper appearance | |
|---|---|---|---|---|---|---|---|
| | | ASTM color after test | | Mg. residue/600 g. oil | | | |
| | | Fuel A | Fuel B | Fuel A | Fuel B | Fuel A | B Fuel |
| None | | 5– | 6½– | 12.4 | 46.4 | Black | Black. |
| Polymer A (control) | 5 (0.0017) | 5– | 6½– | 10.9 | 44.5 | do | Dark brown. |
| | 10 (0.0033) | 5– | 6– | 7.3 | 6.3 | Grey-black | Do. |
| | 15 (0.005) | 5– | 6– | 2.5 | 4.3 | Grey | Brown, spotted. |
| I | 5 (0.0017) | 5– | 2– | 3.0 | 0.2 | do | Grey Brown. |
| | 10 (0.0033) | 4– | 2– | 0.4 | 0.0 | Light grey | Tan. |
| | 15 (0.005) | 4– | 2– | 0.0 | 0.0 | Tan | Colorless. |
| II | 5 (0.0017) | 4– | 2– | 0.0 | 2.1 | Grey | Grey. |
| | 10 (0.0033) | 4– | 2– | 0.0 | 1.1 | Light grey | Light grey. |
| | 15 (0.005) | 4– | 2– | 0.0 | 1.3 | Very light grey | Colorless. |
| III | 10 (0.0033) | 4– | 2– | 1.3 | 1.3 | Light grey | Tan. |
| | 15 (0.005) | 4– | 2– | 0.7 | 0.0 | Almost colorless | Very light tan. |
| IV | 15 (0.005) | 4– | 2– | 0.9 | 0.0 | do | Do. |
| V | 15 (0.005) | 4– | 2– | 0.4 | 0.8 | do | Almost colorless. |

The data show that the co-additive blends containing N,N-dimethylcyclohexylamine are greatly superior to the basic amino nitrogen-containing polymer alone in stabilizing fuel against discoloration and formation of sediment, particularly in the EMD Diesel Fuel Test.

EXAMPLE 2

Samples of Fuel B of Example 1, treated to contain N,N-dimethylcyclohexylamine (DMCHA), Polymer A, and mixtures thereof, as given below, are subjected to the EMD Diesel Fuel Test. Table III shows typical results of such treatment.

*Table III*

| Additive and conc. | Lbs./1,000 bbls. | EMD Diesel Fuel Test—Filter paper appearance |
|---|---|---|
| None | | Black |
| DMCHA | 1 | Grey black. |
| | 2 | Grey. |
| | 3 | Light grey. |
| | 5 | Tan. |
| | 7 | Do. |
| | 10 | Do. |
| | 15 | Light tan. |
| Polymer A | 5 | Brown, spotted |
| | 10 | Do. |
| | 15 | Do. |
| Polymer A 10 lbs. plus DMCHA | 1 | Brown. |
| | 2 | Light brown. |
| | 3 | Tan. |
| | 4 | Very light tan. |
| | 5 | Colorless. |

From Table III, it is apparent that the non-polymeric N,N-dimethylcyclohexylamine is a more effective high temperature stabilizer than the basic amino nitrogen-containing copolymer. However, the effectiveness of each is limited, and only the combination of the two additives gives a clean blotter (appearance of filter paper).

EXAMPLE 3

The cyclohexyl tertiary amine (DMCHA) is surprisingly effective by comparison with non-polymeric aliphatic primary amines, represented by a commercial mixture of $C_{12}$–$C_{15}$ tertiary alkyl primary amines sold as "Primene" 81–R, in fuel oils containing a basic amino nitrogen-containing copolymer, as shown in Table IV below wherein the fuel oil is Fuel B of Example 1.

*Table IV*

COMPARISON OF AMINES AS CO-ADDITIVES WITH POLYMER A IN THE EMD DIESEL FUEL TEST

[Polymer A conc.=10 lbs./1,000 bbls.]

| Amine concentration, lbs./1,000 bbls. | "Primene" 81-R | DMCHA* |
|---|---|---|
| 0 | Brown, spotted | Brown, spotted. |
| 1 | do | Brown. |
| 2 | do | Light brown. |
| 3 | do | Tan. |
| 4 | do | Very light tan. |
| 5 | do | Colorless. |

*The DMCHA data are from Table III.

This cyclohexyl tertiary amine is clearly superior to the mixture of $C_{12}$–$C_{15}$ tertiary alkyl primary amines in this use.

EXAMPLE 4

N,N-diethylcyclohexylamine and N-methylcyclohexylamine were evaluated in conjunction with Polymer A (described in Example 1) in the EMD Diesel Fuel Test (also described in Example 1). The fuel was a typical full-boiling commercial distillate fuel for oil-burner and diesel engine use. In each test, the concentration of Polymer A was 10 lbs./1000 bbls. (0.0033% wt.), that of the N-substituted cyclohexylamine 5 lbs./1000 bbls. (0.0017% wt.), corresponding to a 1:1 amine:polymer active ingredient ratio.

The control run, fuel oil containing only Polymer A at a concentration of 15 lbs./1000 bbls. (0.005% wt.), failed this test (dirty filter paper) and had a resultant ASTM color rating L–6.5 (i.e. 6.5—). In each case, the fuel oil containing the N-substituted cyclohexylamine passed the test (essentially clean filter paper) and the ASTM color rating was only L–5.5. On the basis of these results, it is apparent that these N-substituted cyclohexylamines are as effective as N,N-dimethylcyclohexylamine.

It will be understood that the preceding examples have been given for illustrative purposes solely and that this invention is not limited to the specific embodiments described therein. On the other hand, it will be apparent to those skilled in the art that, subject to the limitations set forth in the general disclosure, many variations and modifications can be made in the materials, proportions and conditions employed, without departing from the spirit or scope of this invention.

From the preceding description, it will be apparent that this invention provides distillate hydrocarbon fuel oils which are stabilized against objectionable deterioration by novel combinations of additives which, in combination are unusually effective for such purpose. It will also be apparent that this invention provides novel additive compositions for distillate hydrocarbon fuel oils which compositions are homogeneous concentrates of combinations of co-additives which in combination are unusually effective for stabilizing distillate hydrocarbon fuel oils. Accordingly, it will be apparent that this invention constitutes a valuable contribution to and advance in the art.

The embodiments of the invention in which an exclusive property or privilege is claimed are defined as follows:

1. An additive composition for distillate hydrocarbon fuel oils, which additive composition consists essentially of
   (a) an oil-soluble, basic amino nitrogen-containing addition copolymer which is a 50/40/10 tripolymer of octadecenyl methacrylate, styrene and beta-diethylaminoethyl methacrylate contained in combined form as the essential monomeric co-polymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C.,
   (b) from about 0.5 to about 2 parts by weight per part of said tripolymer (a) of N,N-dimethylcyclohexylamine, and
   (c) a normally liquid inert hydrocarbon carrier solvent in an amount to constitute from about 40% to about 60% by weight of the composition.

2. An additive composition for distillate hydrocarbon fuel oils, which additive composition consists essentially of
   (a) an oil-soluble, basic amino nitrogen-containing addition copolymer which is a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C.,
   (b) from about 0.5 to about 2 parts by weight per part of said tripolymer (a) of N,N-dimethylcyclohexylamine,
   (c) a normally liquid inert hydrocarbon carrier solvent in an amount to constitute from about 40% to about 60% by weight of the composition, and
   (d) from about 0.3 to about 0.5 part by weight per part of said tripolymer (a) of dicocodimethyl ammonium chloride.

3. A distillate hydrocarbon fuel oil containing
   (a) from about 0.0005% to about 0.005% by weight of an oil-soluble, basic amino nitrogen-containing addition copolymer which is a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C., and
(b) from about 0.0005% to about 0.002% by weight of N,N-dimethylcyclohexylamine.

4. A distillate hydrocarbon fuel oil containing
(a) from about 0.0005% to about 0.005% by weight of an oil-soluble, basic amino nitrogen-containing addition copolymer which is a 50/40/10 tripolymer of octadecenyl methacrylate, styrene and beta-diethylaminoethyl methacrylate contained in combined form as the essential monomeric copolymerizable ethylenically unsaturated compounds, said tripolymer containing 0.1% to 3.5% by weight of basic amino nitrogen and having an inherent viscosity of 0.1 to 3.0 as determined at 0.1% weight/volume concentration in benzene at 25° C.,
(b) from about 0.0003% to about 0.002% by weight of N,N-dimethylcyclohexylamine, and
(c) from about 0.3 to about 0.5 part by weight of dicocodimethyl ammonium chloride per part of said copolymer (a).

References Cited by the Examiner

UNITED STATES PATENTS

| | | | |
|---|---|---|---|
| 2,550,982 | 5/51 | Eberz | 44—51 |
| 2,684,292 | 7/54 | Caron et al. | 44—74 |
| 2,737,452 | 3/56 | Catlin et al. | 44—62 |
| 2,974,025 | 3/61 | Ertelt et al. | 44—62 |
| 3,008,813 | 11/61 | Siegel | 44—62 |

FOREIGN PATENTS 528,564  7/56  Canada.

OTHER REFERENCES

"Industrial Solvents," by Mellan, 2nd ed., Reinhold Publ. Corp., 1950, pp. 430 and 431.

DANIEL E. WYMAN, *Primary Examiner.*